United States Patent
Robert Jose

(10) Patent No.: US 12,248,729 B2
(45) Date of Patent: Mar. 11, 2025

(54) SOURCE-BASED SOUND QUALITY ADJUSTMENT TOOL

(71) Applicant: Adeia Guides Inc., San Jose, CA (US)

(72) Inventor: Jeffry Copps Robert Jose, Tamil Nadu (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/227,519

(22) Filed: Jul. 28, 2023

(65) Prior Publication Data

US 2023/0367543 A1     Nov. 16, 2023

Related U.S. Application Data

(63) Continuation of application No. 17/180,254, filed on Feb. 19, 2021, now Pat. No. 11,755,278.

(51) Int. Cl.
G06F 3/16     (2006.01)
H04N 7/15     (2006.01)

(52) U.S. Cl.
CPC .............. *G06F 3/165* (2013.01); *G06F 3/162* (2013.01); *G06F 3/167* (2013.01); *H04N 7/15* (2013.01)

(58) Field of Classification Search
CPC .......... G06F 3/165; G06F 3/162; G06F 3/167; H04N 7/15
See application file for complete search history.

(56) References Cited

U.S. PATENT DOCUMENTS

| | | | |
|---|---|---|---|
| 2017/0187884 A1* | 6/2017 | Minor | H04L 65/613 |
| 2021/0224319 A1* | 7/2021 | Ingel | G06F 16/686 |
| 2022/0269473 A1 | 8/2022 | Robert Jose | |

\* cited by examiner

*Primary Examiner* — Fan S Tsang
*Assistant Examiner* — David Siegel
(74) *Attorney, Agent, or Firm* — HALEY GUILIANO LLP

(57) ABSTRACT

Systems and methods for adjusting a sound level during a conference call are disclosed herein. Conferencing application receives an audio input including a first sound and a second sound. A user selectable element is generated for each sound in an user interface, where a user selection setting a first user selectable element associated with the first sound at a user-specified level is received. The sound level for the first sound is adjusted based on the user selection and output at the user-specified level while the second sound is output at a default sound level.

20 Claims, 8 Drawing Sheets

500

```
┌─────────────────────────────────────────────────────┐
│   Receive an audio input at a first device          │
│       of the plurality of devices                   │         502
└─────────────────────────────────────────────────────┘
                          │
                          ▼
┌─────────────────────────────────────────────────────┐
│ Determine that the audio input represents at least a first sound and a │
│ second sound, wherein the first sound is generated from a first source │         504
│        and the second sound is generated from a second source          │
└─────────────────────────────────────────────────────┘
                          │
                          ▼
┌─────────────────────────────────────────────────────┐
│   Generate for display a user selectable element for each sound       │
│   on a user interface of the first device, wherein the user selectable│         506
│        element is adjustable within predetermined sound levels        │
└─────────────────────────────────────────────────────┘
                          │
                          ▼
┌─────────────────────────────────────────────────────┐
│   Receive a user selection setting a first user selectable element    │
│   associated with the first sound at a first sound level different from a │     508
│                       default sound level                              │
└─────────────────────────────────────────────────────┘
                          │
                          ▼
┌─────────────────────────────────────────────────────┐
│   Adjust the first sound to the first sound level specified           │
│                by the user selection                                  │         510
└─────────────────────────────────────────────────────┘
                          │
                          ▼
┌─────────────────────────────────────────────────────┐
│   Output the first sound at the first sound level while outputting the │
│           second sound at the default sound level                      │         512
└─────────────────────────────────────────────────────┘
```

FIG. 5

Before: Voice 0% and Non-Voice 0%
After: Voice + 50% and Non-Voice -30%
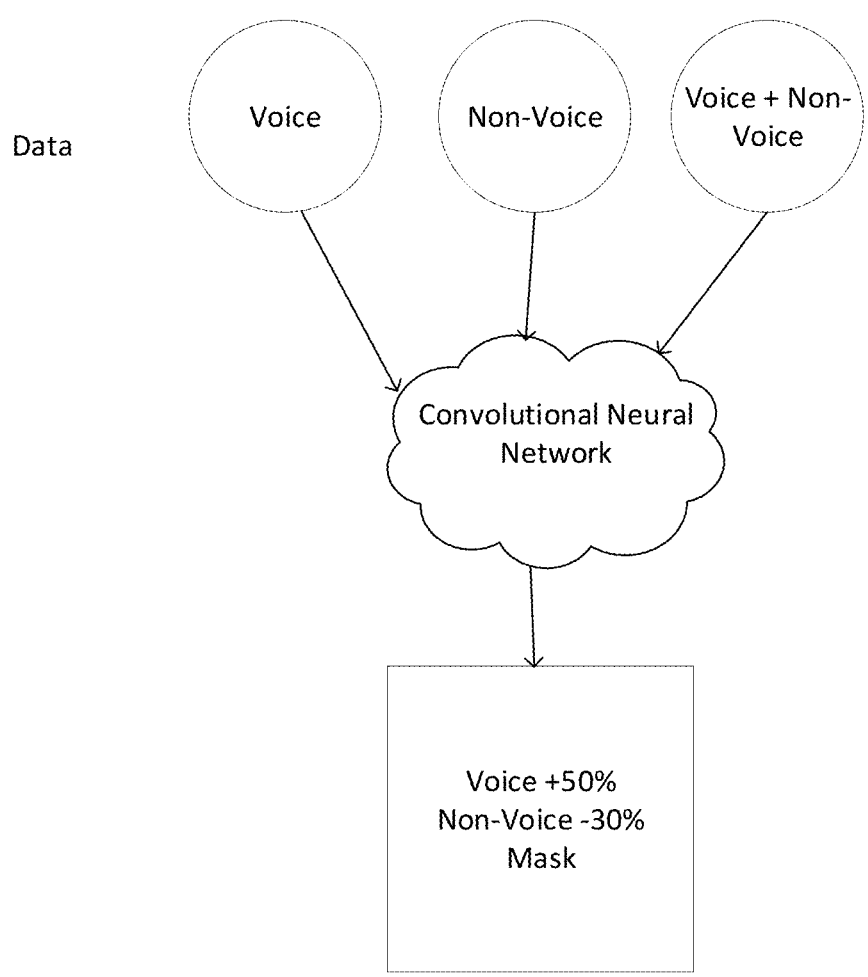
FIG. 6

SOURCE-BASED SOUND QUALITY ADJUSTMENT TOOL

CROSS-REFERENCE TO RELATED APPLICATIONS

This application is a continuation of U.S. patent application Ser. No. 17/180,254, filed Feb. 19, 2021, the disclosure of which is hereby incorporated by reference herein in its entirety.

BACKGROUND

This disclosure is generally related to source-based sound quality enhancement during online meetings. In particular, methods and systems are provided to present user interface tools for adjusting edge-based audio sound during online conference calls.

SUMMARY

With the increasing popularity of online conferencing tools over networks, online conferencing tools have become the most popular means to conduct meetings over the Internet. Sometimes, there may be external noise coming from a source that is not a part of the intended audio input (e.g., dog barking on the street). In other times, the online conferencing tools may detect certain sounds as external noise, when in fact, those sounds were a part of the intended audio input (e.g., drum sound for an online music class).

To address such issues, in one existing approach, the system will simply identify different sounds based on distance estimation techniques (e.g., a distance from a microphone) and perform automatic noise reduction. However, this approach is deficient, because there may be noise that is generated in proximity to the microphone that was not meant to be a part of the audio input that the user intended. In one example, during a conference call at home, a dog may come by and start barking. Since the dog is close to the user who is wearing a headset, the dog barking sound may be detected as an audio input and transmitted to other participants of the call. In another example, audio input may be intended by the user (e.g., guitar sound across the room for guitar practice), but the online conferencing tool may automatically detect it as external noise and perform noise reduction due to its distance from the microphone. Detecting external noise correctly and adjusting its level remains a problem to solve due to many variations and sources from which the extra noise can be generated.

The present disclosure addresses the problems described above by, for example, providing systems and methods for source-based audio identification and edge-based audio sound adjustment. For example, during a conference call involving a plurality of devices, a conferencing application implemented on a device of the plurality of devices receives an audio input including a first sound and a second sound, each of which comes from a respective source. For example, a first sound may come from a first source (e.g., dog barking), and a second sound may come from a second source (e.g., user A's voice). Upon detecting that the audio input includes the first sound and the second sound, user-selectable elements for each sound are generated on a user interface of the device, where each user-selectable element is adjustable within predetermined ranges.

The conferencing application may receive a selection from a user setting a first user-selectable element at a user-specified sound level for the first sound (e.g., reducing the first sound level by 50%). Upon receiving the user selection, the conferencing application adjusts the sound level of the first sound to the user-specified sound level and outputs the first sound at the user-specified level while outputting the second sound at a default level (if no user selection is made to the second sound).

Accordingly, the systems and methods described herein provide an improved way of identifying various sounds contained in the audio input and adjusting a respective sound level by providing a graphical user interface element that enables a selective modification, which is triggered by a user consuming the audio input. Techniques for identifying various sounds are performed in a source-based manner, and techniques for adjusting a respective sound level are performed in an edge-based manner. The system allows selective tuning of an audio sound level based on a source type by providing a graphical user interface widget for each sound contained in the audio input received at a respective computing device.

It should be noted that the systems, methods, apparatuses, and/or aspects described above may be applied to, or used in accordance with, other systems, methods, apparatuses, and/or aspects described in this disclosure.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 depicts an illustrative flowchart of a process for adjusting a sound level based on a source type, in accordance with some embodiments of the disclosure;

FIG. 6 depicts an exemplary process of generating a mask for training a learning model, in accordance with some embodiments of the disclosure;

DETAILED DESCRIPTION

Figure 1:
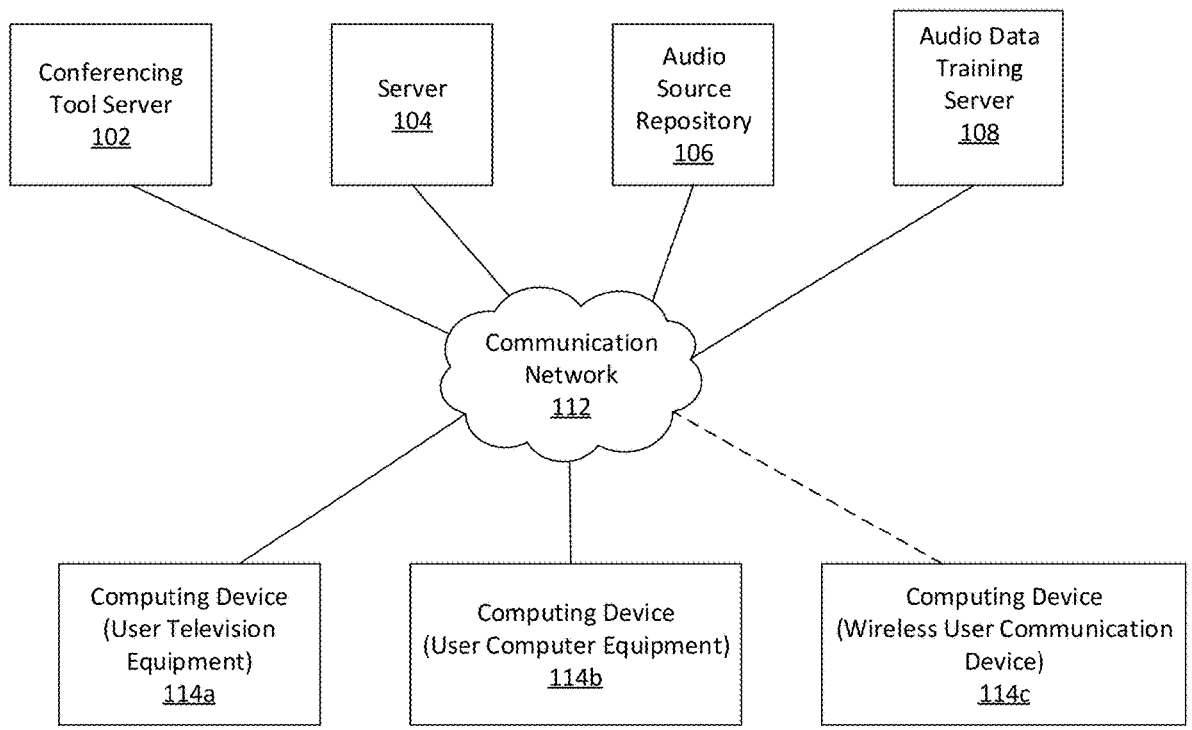
FIG. 1 depicts an illustrative block diagram of a system for selective tuning of a sound level based on a source type, in accordance with some embodiments of the disclosure.

FIG. 1 shows an illustrative block diagram of a system 100 for selective tuning of a sound level based on a source type, in accordance with some embodiments of the disclosure. In one aspect, system 100 includes one or more of conferencing tool server 102, server 104, audio source repository 106, audio data training server 108, and communication network 112.

Communication network 112 may be one or more networks including the Internet, a mobile phone network, mobile voice or data network (e.g., a 4G or LTE network), cable network, public switched telephone network or other types of communication network or combinations of communication networks. Communication network 112 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 112 communicatively couples various components of system 100 to one another. For instance, server 104 may be communicatively coupled to conferencing tool server 102, audio source repository 106, and/or audio data training server 108 via communication network 112. Conferencing tool server 102 hosts one or more online conference meetings that allow users to participate in conference calls involving one or more user devices.

In some examples, audio source repository 106 and audio data training server 108 may be integrated as one device. Audio source repository 106 may store one or more types of sounds generated from different sources. The audio source repository 106 stores sound waves or frequency-domain signals associated with respective sounds.

Audio data training server 108 may receive sound data from audio source repository 106 or computing device 114a, 114b, 114c, and train audio data using any suitable approach. In some embodiments, audio data training server 108 may train data sets required to identify a specific source from which a respective sound is generated. In some examples, audio data training server 108 may use audio signals captured by computing device 114a, 114b, 114c, and separates the audio signals using a source separation algorithm. The sources are permuted in different ways for a learning model to converge. The audio data training server trains the learning model using a high compute capability algorithm where the learning model is built based on meeting-specific context of the conference calls.

In some embodiments, the audio data from audio source repository 106 or audio data training server 108 may be provided to server 104 connected to computing device 114a, 114b, 114c using a client/server approach. For example, computing device 114a, 114b, 114c may pull audio data from server 104, or a server may push audio data to computing device 114a, 114b, 114c. In some embodiments, a client application (e.g., conferencing application) residing on computing device 114a, 114b, 114c may initiate sessions with server 104 to obtain audio data when needed, e.g., when the audio data is out-of-date or when computing device 114 receives a request from the user to receive audio data.

As described in further detail below, server 104 may access the audio of the video conference call(s) hosted by conferencing tool server 102 and, based on the detected audio signal, generates a variety of types of audio data and/or metadata (e.g., content identifier, audio identifier, converted audio signal) that can be accessed to facilitate the adjustment and modification of audio signal made available through user input interface 222 of computing device 114 of FIG. 2. In one embodiment, server 104 and conferencing tool server 102 are interchangeable. In another embodiment, server 104 and conferencing tool server 102 may be integrated as one device.

System 100 also includes one or more computing devices 114, such as user television equipment 114a (e.g., a set-top box), user computer equipment 114b (e.g., a laptop), and wireless user communication device 114c (e.g., a smartphone), that users can use to interact with server 104, via communication network 112, to adjust a sound level during a conference call. For instance, in some aspects, server 104 may provide a user interface via computing device 114, by which a user can adjust a sound level for a particular sound of audio input from a video conference call. Although FIG. 1 shows one of each component, in various examples, system 100 may include multiples of one or more illustrated components. For instance, system 100 may include multiple conferencing tool servers 102, and server 104 may aggregate audio data from the multiple video conferences hosted by multiple conferencing tool servers 102, respectively.

In some embodiments, one or more users associated with computing devices 114a, 114b, 114c participate in a conference call, jointly or individually at remote locations from one another. One or more servers 104 or one or more conferencing tool servers 102 may be used to communicate with one or more computing devices 114a, 114b, 114c.

Figure 2:
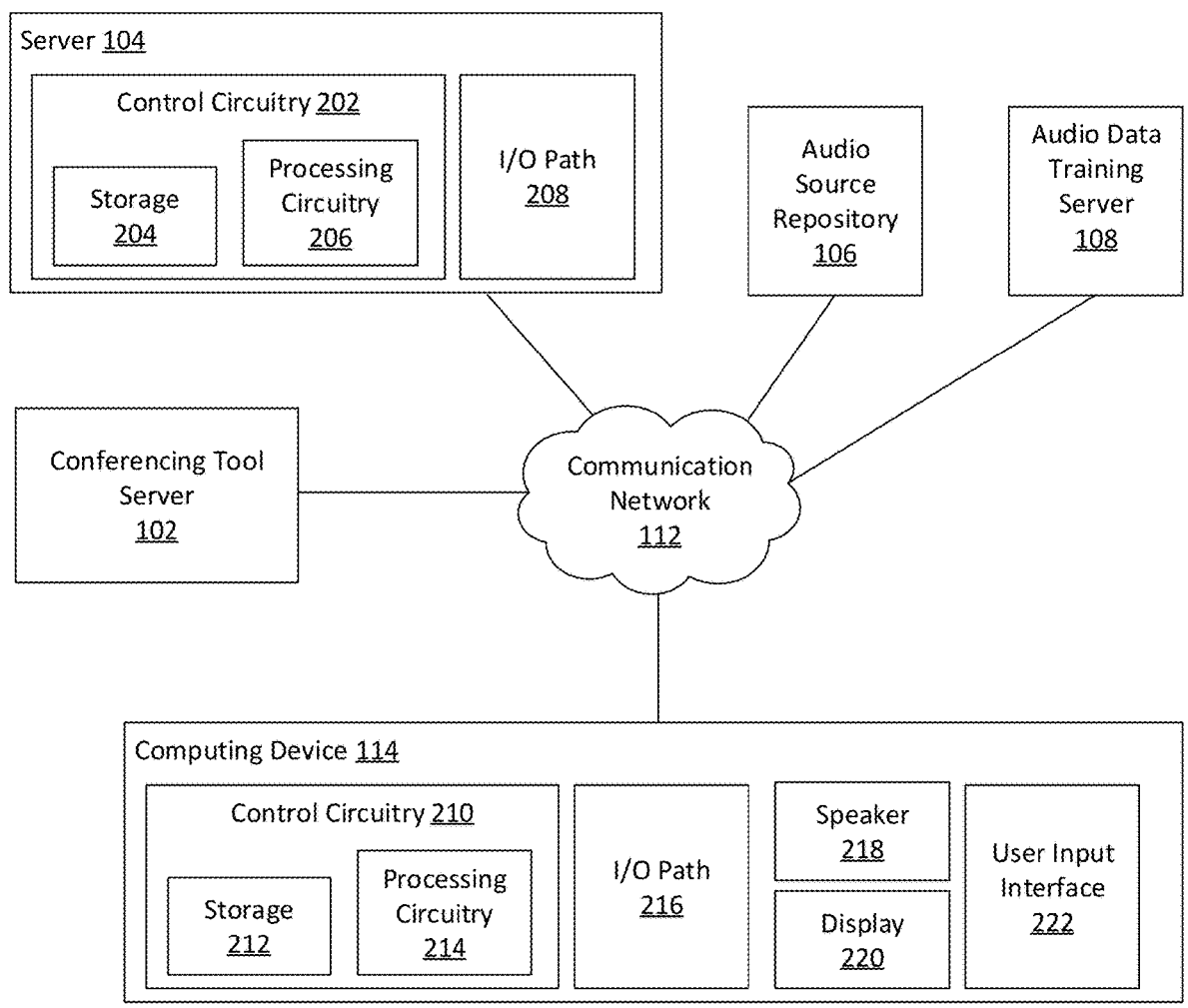
FIG. 2 depicts an illustrative block diagram showing additional details of the system for selective tuning of a sound level based on a source type, in accordance with some embodiments of the disclosure.

FIG. 2 is an illustrative block diagram showing additional details of the system 100 for selective tuning of a sound level based on a source type, in accordance with some embodiments of the disclosure. In particular, server 104 includes control circuitry 202 and input/output (I/O) path 208, and control circuitry 202 includes storage 204 and processing circuitry 206. Computing device 114 includes control circuitry 210, I/O path 216, speaker 218, display 220, and user input interface 222. Control circuitry 210 includes storage 212 and processing circuitry 214. Control circuitry 202 and/or 210 may be based on any suitable processing circuitry such as processing circuitry 206 and/or 214. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 204, storage 212, and/or storage of other components of system 100 (e.g., audio source repository 106 and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder or PVR), solid-state devices, quantum storage devices, gaming consoles, gaming media, or any other suitable fixed or removable storage devices, and/or any combination of the same. Each of storage 204, storage 212, and/or storage of other components of system 100 may be used to store various types of content, audio data, and or other types of data. Non-volatile memory may also be used (e.g., to launch a boot-up routine and other instructions). Cloud-based storage may be used to supplement storages 204, 212 or instead of storages 204, 212. In some embodiments, control circuitry 202 and/or 210 executes instructions for an application stored in memory (e.g., storage 204 and/or 212). Specifically, control circuitry 202 and/or 210 may be instructed by the application to perform the functions discussed herein. In some implementations, any action performed by control circuitry 202 and/or 210 may be based on instructions received from the application. For example, the application may be implemented as software or a set of executable instructions that may be stored in storage 204 and/or 212 and executed by control circuitry 202 and/or 210. In some embodiments, the application may be a client/server application where only a client application resides on computing device 114, and a server application resides on server 104.

The application (e.g., conferencing application) may be implemented using any suitable architecture. For example, it may be a stand-alone application wholly implemented on computing device 114. In such an approach, instructions for the application are stored locally (e.g., in storage 212), and data for use by the application is downloaded on a periodic basis (e.g., from an out-of-band feed, from an Internet resource, or using another suitable approach). Control circuitry 210 may retrieve instructions for the application from storage 212 and process the instructions to perform the functionality described herein. Based on the processed instructions, control circuitry 210 may determine what action to perform when input is received from user input interface 222.

Figure 3:
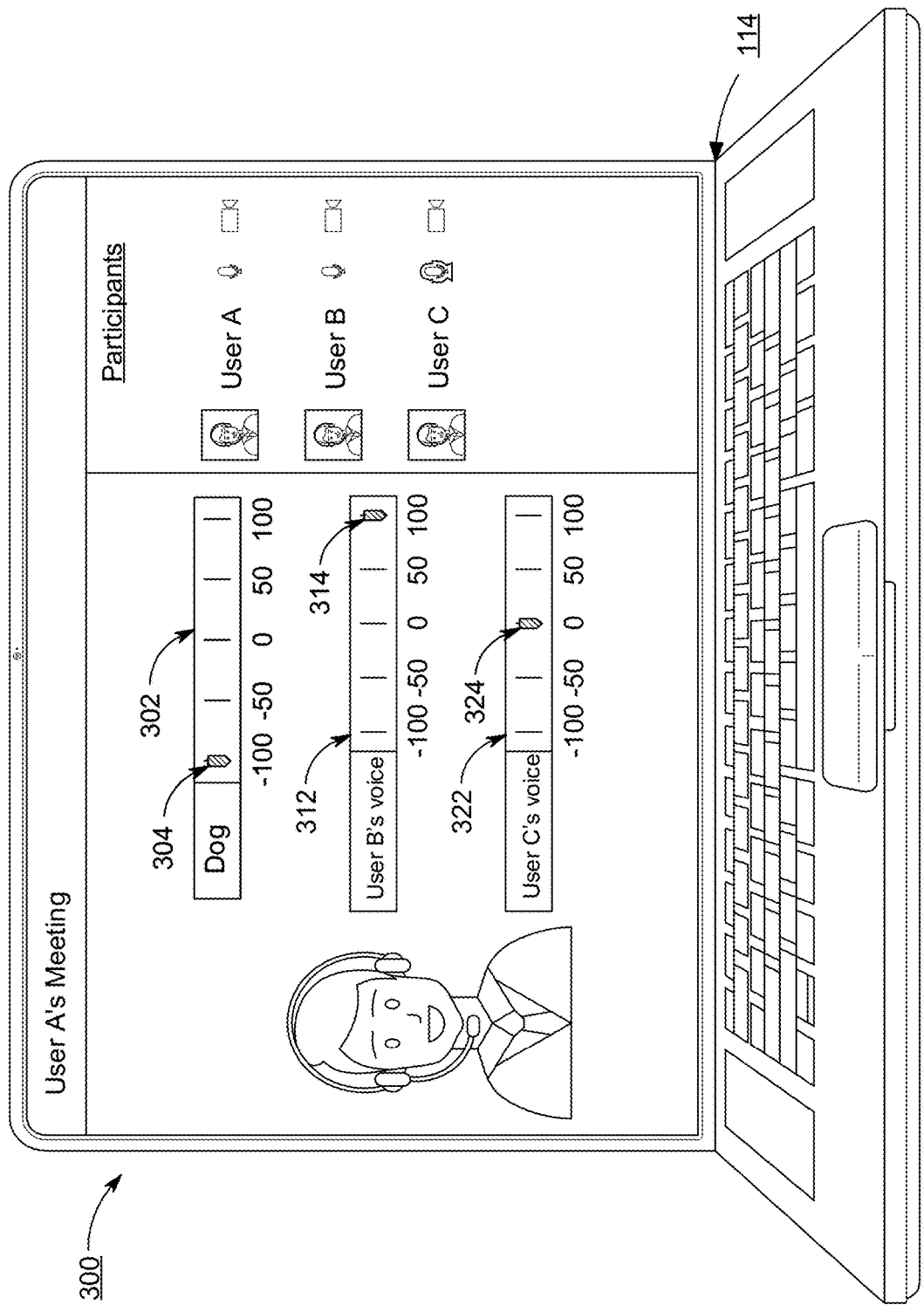
FIG. 3 depicts an exemplary user interface for providing a user-selectable element for selective tuning of a sound level on the illustrative device, in accordance with some embodiments of the disclosure.

As shown in FIG. 3, a segment of a video conference (e.g., online meeting over the Internet) is streamed on computing device 114 via the conferencing application. The conferencing application may be a stand-alone application implemented on a user equipment device. The conferencing application may generate a user-selectable element 302, 312, 322 for display, which indicates a sound level of a particular sound contained in audio input received at computing device 114, while a segment of the video conference call is presented on computing device 114. In some embodiments, the segment can be a live segment presented in real time.

In client/server-based embodiments, control circuitry 210 may include communication circuitry suitable for communicating with an application server (e.g., server 104) or other networks or servers. The instructions for carrying out the functionality described herein may be stored on the application server. Communication circuitry may include a cable modem, integrated services digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 112). In another example of a client/server-based application, control circuitry 210 runs a web browser that interprets web pages provided by a remote server (e.g., server 104). For example, the remote server may store the instructions for the application in a storage device. The remote server may process the stored instructions using circuitry (e.g., control circuitry 202) and generate the displays discussed herein. Computing device 114 may receive the displays generated by the remote server and may display the content of the displays locally via display 220. This way, the processing of the instructions is performed remotely (e.g., by server 104) while the resulting displays are provided locally on computing device 114. Computing device 114 may receive inputs from the user via input interface 222 and transmit those inputs to the remote server for processing and generating the corresponding displays.

A user may send instructions to control circuitry 202 and/or 210 using user input interface 222. User input interface 222 may be any suitable user interface, such as a remote control, trackball, keypad, keyboard, touchscreen, touchpad, stylus input, joystick, voice recognition interface, microphone interface, sound capturing interface, sound recording interface, or other user input interfaces. User input interface 222 may convert user input to an electrical signal. User input interface 222 may be integrated with or combined with speaker 218 or display 220, which may be a monitor, a television, a liquid crystal display (LCD), electronic ink display, or any other equipment suitable for displaying visual images. In some embodiments, system 100 includes an additional component, such as a microphone component, that detects sounds and converts sounds into electrical signals for speech recognition. In some embodiments, the additional component works in connection with user input interface 222.

Server 104 and computing device 114 may receive content and data via I/O paths 208 and 216, respectively. I/O paths 208, 216 may provide content (e.g., conference call content, Internet content, content available over a local area network (LAN) or wide area network (WAN), and/or other content) and data to control circuitry 202, 210. Control circuitry 202, 210 may be used to send and receive commands, requests, and other suitable data using I/O paths 208, 216. I/O paths 208, 216 may connect control circuitry 202, 210 (and specifically processing circuitry 206, 214) to one or more communication paths (described below). I/O functions may be provided by one or more of these communication paths but are shown as single paths in FIG. 2 to avoid overcomplicating the drawing.

FIG. 3 depicts an exemplary user interface 300 for providing a user-selectable element for adjusting a sound level on the illustrative device. A video conference is transmitted to computing device 114 associated with user A. The conference call includes three participants: user A, user B, and user C. Upon detecting audio input from participants of the conference call, or transmitting audio signals to user A's device, a user-selectable element is presented in a user interface of computing device 114. The user-selectable element (e.g., graphical user interface widget) may be generated for each sound.

For example, in exemplary user interface 300, a first user-selectable element 302 is generated for a dog sound detected as part of user B's background noise. A second user-selectable element 312 is generated for user B's voice. A third user-selectable element 322 is generated for user C's voice. In some embodiments, each user-selectable element includes a sound label. For example, first user-selectable element 302 includes a sound label "dog." Second user-selectable element 312 includes a sound level "user B's voice." Third user-selectable element 322 includes a sound level "user C's voice."

In some embodiments, the conferencing application generates a list of entities in a user interface of user A's device. Each entity may identify a source of a sound. For example, exemplary user interface 300 lists three sources (e.g., entities) in the list (e.g., dog, user B's voice, user C's voice). In some embodiments, the list for user A may be different from a list for another user (e.g., user B).

The user-selectable element may be in any graphical user interface component that can receive user input. In some embodiments, the user-selectable element may be a slider or a track bar in which a user may set a specific value by moving an indicator. For example, the slider includes a level indicator that moves along a sliding region of a predetermined range presented on the user interface. In some embodiments, the user-selectable element has a field for receiving user input where the user can type in a desired value in the field.

In exemplary user interface 300, user-selectable elements 302, 312, 322 includes level indicators 304, 314, 324 representing a current sound level in the predetermined range of the sound setting. A sound level may range from −100% (e.g., removing the sound completely) to 100% (e.g., amplifying the sound to the max). Although the range from 100% to −100% was used for illustration purposes, any range may be used based on the audio signal's strength.

The user may select any value within the predetermined range, and the sound is either enhanced (e.g., amplified) or reduced (e.g., decreased) correspondingly. In some embodiments, a corresponding weight filter associated with the user-specified value may be applied to modify a sound level. In some embodiments, the conferencing application initializes a level indicator at a default value. The default value may be 0% representing an original sound level as the sound was captured and transmitted to other participants of the call. If a user selection is not made to modify the sound level, then the user-selectable element is initialized at the default value of 0%. As a result, no filter is applied to modify the sound level. In some embodiments, the sound modification is based on the sound's statistical spectral features, such as flatness, perceptual spread, or shape of the sound.

In exemplary user interface 300, user A hears that user B's dog was barking while user B was talking. In this scenario, User A may want to remove the dog sound. Therefore, user A may place level indicator 304 for the dog sound at −100% to completely remove the barking sound. As a result, the conferencing application removes the dog barking sound on user A's end, and no dog sound is output on user A's device. Thus, user A no longer hears the dog barking sound. It should be noted that user C may still hear the dog barking sound if user C does not adjust a level indicator presented on a user interface of user C's device.

In the same scenario, User A may want to increase user B's voice to hear user B better due to the external noise. Therefore, user A may place level indicator 314 for user B's voice at 100% to maximize user B's voice. As a result, the conferencing application outputs the user B's voice at the maximum level specified by user A on user A's device. It should be noted that user B's voice may still be transmitted at the default level to user C's device if user C does not modify a sound level for user B's voice.

In the same scenario, user A can hear user C's voice well, so user A may not change level indicator 324 for user C's voice. As a result, the conferencing application transmits user C's voice to user A as user C's voice was captured at user C's device, and the user C's voice is transmitted to user A's device without any modification.

Figure 4:
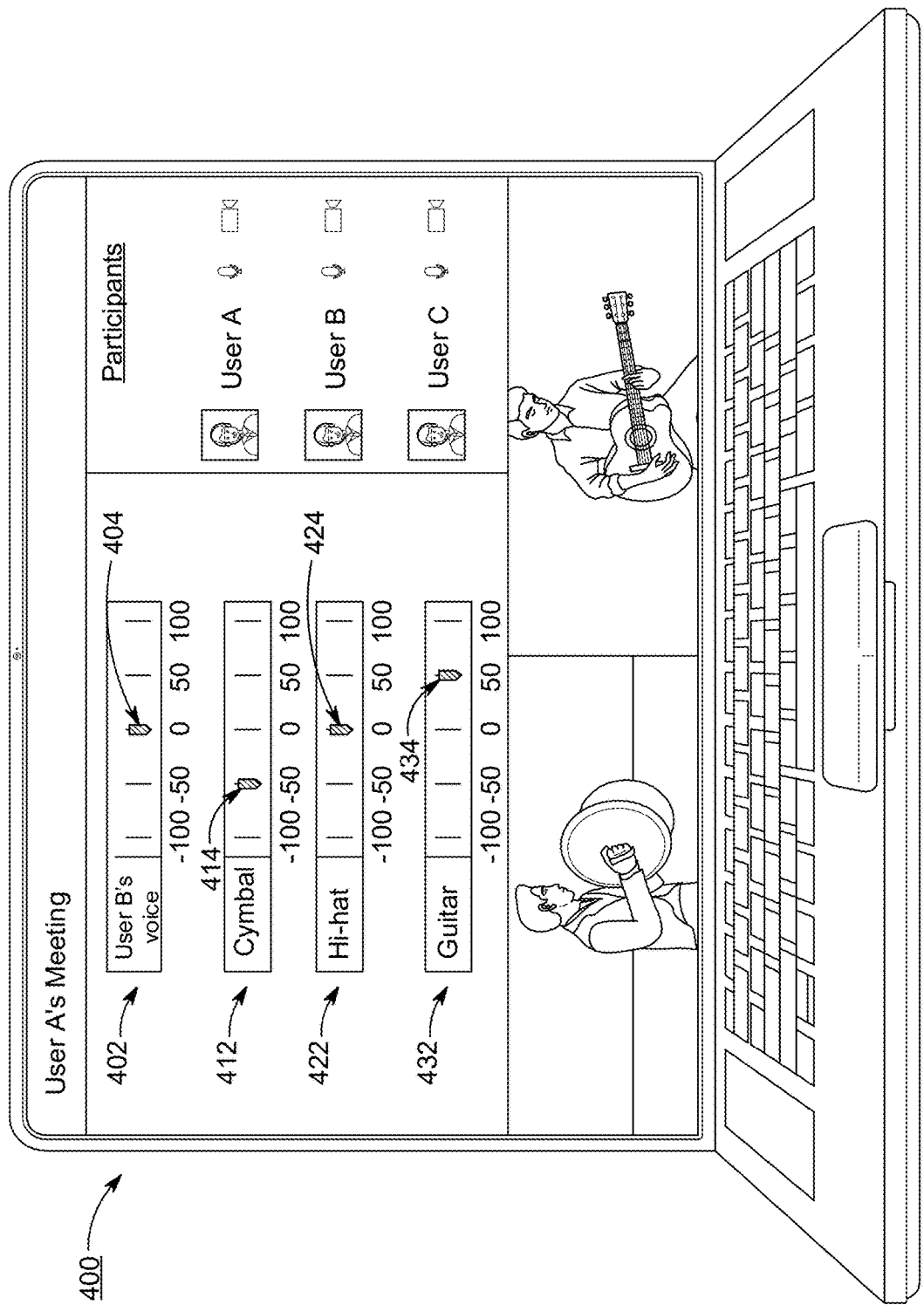
FIG. 4 depicts an exemplary user interface for providing a user-selectable element for selective tuning of a sound level on an illustrative device, in accordance with some embodiments of the disclosure.

FIG. 4 shows another exemplary user interface 400 for providing a user-selectable element for adjusting a sound level on an illustrative device, in accordance with some embodiments of the disclosure. In some embodiments, the conferencing application identifies non-human sound as part of the audio input. The non-human sound is generated from any source that is not human, such as a dog, cat, instruments, ambulance, etc. The conferencing application identifies a sound source at different levels using a learning model trained by audio data training server 108 based on data sets stored in audio source repository 106.

In some embodiments, the conferencing application differentiates sounds at a finer granularity level (e.g., different instruments as sound sources). As shown in exemplary user interface 400, the conferencing application identifies instrument sounds detected during a conference call. For each instrument sound, the conferencing application generates a user-selectable element. For example, a first user-interface element 402 is generated for a user B's voice. A second user-interface element 412 is generated for a cymbal sound. A third user-interface element 422 is generated for a hi-hat sound. A fourth user-interface element 432 is generated for a guitar sound.

For example, during an online music class, as shown in FIG. 4, if user A wants to hear the orchestra music with reduced cymbal sound and amplified guitar sound, then user A can simply move a level indicator 414 to a lower value than the default value (e.g., 0%) and moves a level indicator 434 to a higher value than the default value. As a result, the cymbal sound is reduced, and the guitar sound is amplified. For other sounds, such as user B's voice or hi-hat sound, these sounds will remain the same and will be transmitted to user A's device at the original level, as level indicators 404, 424 are positioned at the default value. It should be noted that the adjusted sound is transmitted at the same time that the unadjusted sound is transmitted if these sounds were captured simultaneously. For example, if user B plays cymbal while user C is playing hi-hat, then the reduced cymbal sound is output at the same time the unreduced hi-hat sound is output.

Reference is now made to FIG. 5, which depicts an illustrative flowchart of process 500 for edge-based sound quality enhancement that may be implemented by using system 100, in accordance with some embodiments of the disclosure. In addition, one or more steps of the process described in FIG. 5 may be incorporated into or combined with exemplary user interface 300 of FIG. 3 and additional exemplary user interface 400 of FIG. 4. In some embodiments, process 500 may be performed by the conferencing application implemented on computing device 114. It should be noted that process 500 is local to computing device 114 that receives audio input from other computing devices of the plurality of computing devices of a conference call.

At 502, control circuitry 210 receives an audio input at a first device of a plurality of devices during a conference call. The conference call may involve one or more users, and each user is associated with at least one device, such as a laptop, mobile phone, or a notepad 114a, 114b, 114c. Each device may capture or detect audio input via the respective user input interface 222 of the computing device 114. The captured sound can be any type of sounds such as human voice, non-human sound, or instrument sound. The captured sound is transmitted to other participant devices of the conference call. Thus, the first device (e.g., user A's device) of the plurality of devices receives audio input transmitted from at least one of the plurality of devices.

At block 504, control circuitry 210 determines that the received audio input includes one or more sounds from a respective source. For example, while user B is talking, user B's dog is barking behind user B. Control circuitry 210 determines that the audio input represents at least two sounds: a first sound (e.g., dog barking) and a second sound (e.g., user B's voice). The first sound is generated from a first source (e.g., dog), and the second sound is generated from a second source (e.g., user B).

At block 506, control circuitry 210 generates for display a user-selectable element for each sound on a user interface of the device. User input on the user-selectable element triggers an adjustment of a corresponding sound level. The user-selectable element may be in any graphical user interface widget format that can receive user input for setting a sound level of an associated sound source. In one example, the user-selectable element may be a slider that moves along a sliding region of the user-selectable element within predetermined ranges. The values in the defined range of values are associated with different positions along the sliding region and can be indicated (e.g., using a level indicator) along the sliding region. As such, a user can select different values in the range of values by moving the slider to the different positions along the sliding region. In another example, the user-selectable element may be a button or a toggle switch, which provides a set of values.

In some embodiments, the user-selectable element is generated in real time. For example, a new user-selectable element is generated simultaneously as audio input (including a new sound source) is received at computing device 114. For example, if a new sound is detected, then a user-selectable element for that particular sound is generated. On the other hand, if a particular sound is no longer detected, then the user-selectable element for that particular sound is removed from the user interface of computing device 114.

At block 508, control circuitry 210 receives a user input setting a first sound at a first level. The first level may be any sound level that is different from a default level (e.g., 0%). The default level is a preselected level where the sound is originally detected by user input interface 222 and transmitted to computing device 114 without any modification (e.g., without applying any filter). A sound level may range from −100% (e.g., removing the sound completely) to 100% (e.g., amplifying the sound to the max). The user-selectable element is initialized at the default level without receiving further user input.

At step 510, control circuitry 210 adjusts the first sound to the first sound level specified by the user selection. In some embodiments, a sound level is adjusted based on the sound's statistical spectral features, such as flatness, perceptual spread, or shape of the sound.

At step 512, control circuitry 210 outputs the first sound at the user-specified level while outputting the second sound at a default level. For example, the sounds are output by speaker 218 of computing device 114. The second sound is not modified unless receiving a further input indicating a change.

FIG. 6 is an exemplary process 600 for generating a mask for training a learning model. It should be noted that process 600 may be performed by either conferencing application or by control circuitry 202, 210 of FIG. 2 as instructed by the streaming application that is performed on any client device. In some embodiments, process 600 is performed by audio data training server 108 that is remote from server 104 or computing device 114. Process 600 may be performed in accordance with the training process and prediction process in connection with FIG. 7 and FIG. 8.

As shown in FIG. 6, in one example, during a conference call, the conferencing application captures an audio signal, which includes a voice signal and a non-voice signal. If a user selection indicating to enhance the voice by 50% and to eliminate the non-voice by 30% is received, then the conferencing application separates the audio signal into a voice signal and a non-voice signal, which will be used as input for training a learning model, and combines the voice signal and the non-voice signal as additional input for training the learning model, which will be explained further in FIG. 7.

When training the learning model, the conferencing application uses a combined signal of the voice and the non-voice, as well as an individual voice signal and individual non-voice signal. Any permissible combination of the detected audio signal may be used as input for training the learning model. As shown in the exemplary scenario in 600, for audio input that includes the voice signal and the non-voice signal, at least three input data sets may be generated as a permissible combination: 1) voice, 2) non-voice, and 3) voice combined with non-voice.

Although two audio sources were used herein for ease of explanation, any combination may be generated for a different number of sources. For example, if the audio input includes four sources (e.g., human A voice, human B voice, guitar, dog), then a total of ten input data sets may be generated: 1) human A voice; 2) human B voice; 3) guitar; 4) dog; 5) human A voice combined with the guitar, 6) human A voice combined with the dog, 7) human A voice combined with human B's voice; 8) guitar with the dog; 9) guitar with human B voice; 10) dog with human B voice.

In some embodiments, the audio input signals are used to train a learning model through a neural network. A weight filter corresponding to a user-specified input is applied to the input signals using the learning model. The output signals (with the corresponding weights applied on respective input signals) may be generated.

Figure 7:
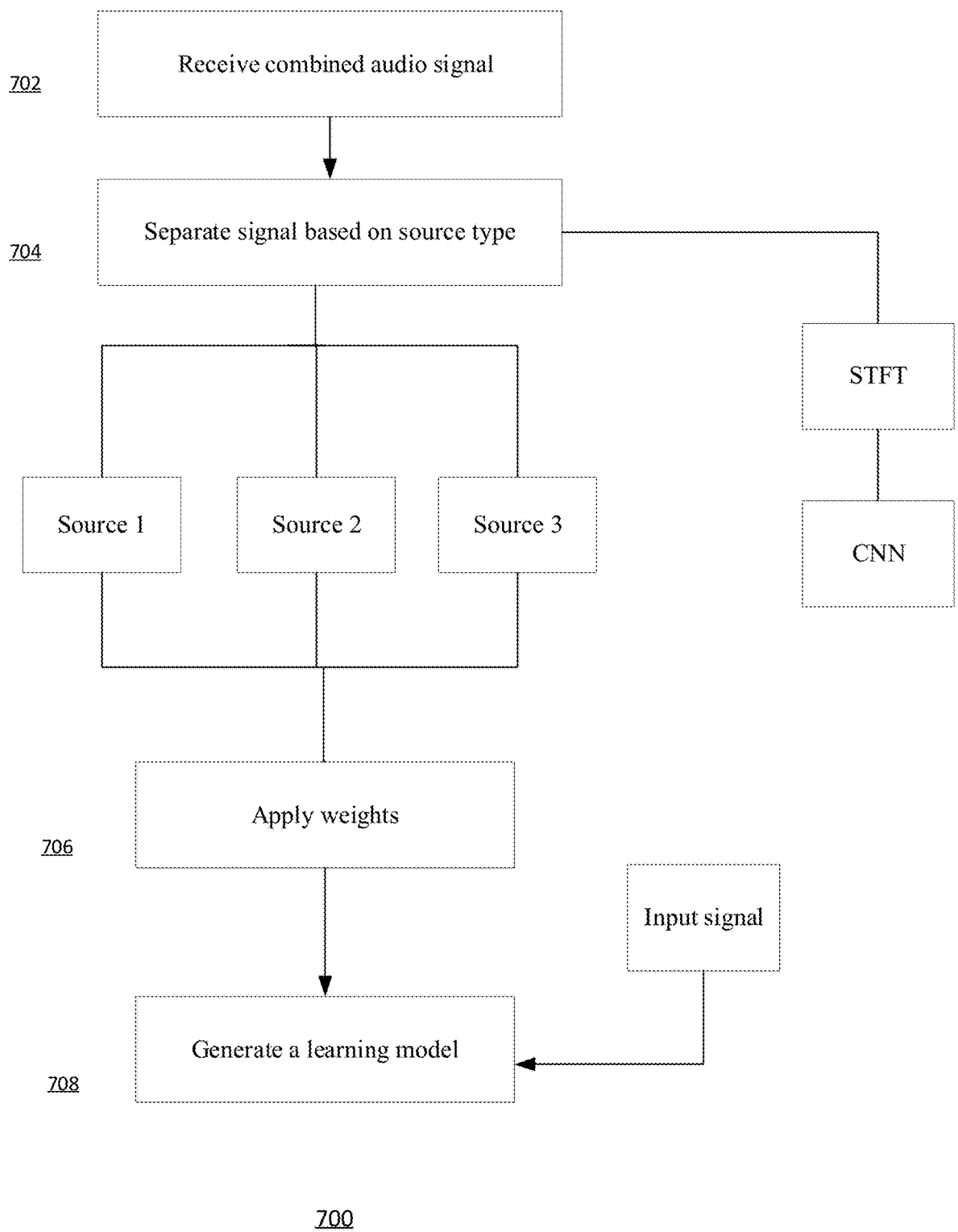
FIG. 7 depicts an illustrative flowchart of a process for training a learning model, in accordance with some embodiments of the disclosure.

FIG. 7 shows an illustrative flowchart of a training process 700 for a learning model. It should be noted that training process 700 may be performed by either conferencing application or by control circuitry 202, 210 of FIG. 2 as instructed by the streaming application that is performed on any client device. In some embodiments, training process 700 is performed by audio data training server 108 that is remote from server 104 or computing device 114.

At step 702, the conferencing application receives combined audio signals in a manner described in FIG. 6. At step 704, the conferencing application separates the source signals based on a source type. Any type of source separation algorithm may be used to differentiate different sources and divide the audio signal into different source types. For example, a short-time Fourier transform (STFT) or convolutional neural network (CNN) may be used, and frequency-domain audio signals are generated. As shown at step 704, the source signals are separated into source 1, source 2, and source 3. These sources can be any type of sources, such as human voice, non-human voice, or instruments.

At step 706, the conferencing application applies corresponding weights indicated by the user (as specified via the user-selectable element) to generate a mask. For example, a weighted filter is generated based on a user-specified selection or input. A weighted filter is applied to each source individually based on the corresponding weights specified by the user. In some embodiments, a filter is used as supervision. The sources are permuted in different ways for the learning model to converge. In some embodiments, the sources are permuted in a way that a specific source is more dominant than other sources.

At step 708, the conferencing application uses the mask generated at step 706, which may work as a label. The masks and labels are learned through a convolutional neural network to generate a learning model based on the input signal. The learning model may be generated and used in real time.

In some embodiments, the conferencing application checks where there is an error and, if so, whether the error is within an acceptable range. If the error is within the acceptable range, then the model is used for any consecutive audio input signals. If the error is not within the acceptable range, then the model is retrained.

In some embodiments, a learning model is local to each computing device 114 of the plurality of computing devices involved in a conference call. In other words, a learning model may be generated for each device. Because a sound level of different audio input is being heard differently on each device, the learning model may be generated at an edge level (e.g., at a device level). Thus, a learning model generated for User A's device may be different from a learning model generated for User B's device.

In some embodiments, the learning model is local to each conference session. The learning model is built based on meeting-specific context, depending on the sounds and noises detected during a particular conference session. Thus, a learning model generated during a conference call may be different from another learning model generated during another conference call.

Figure 8:
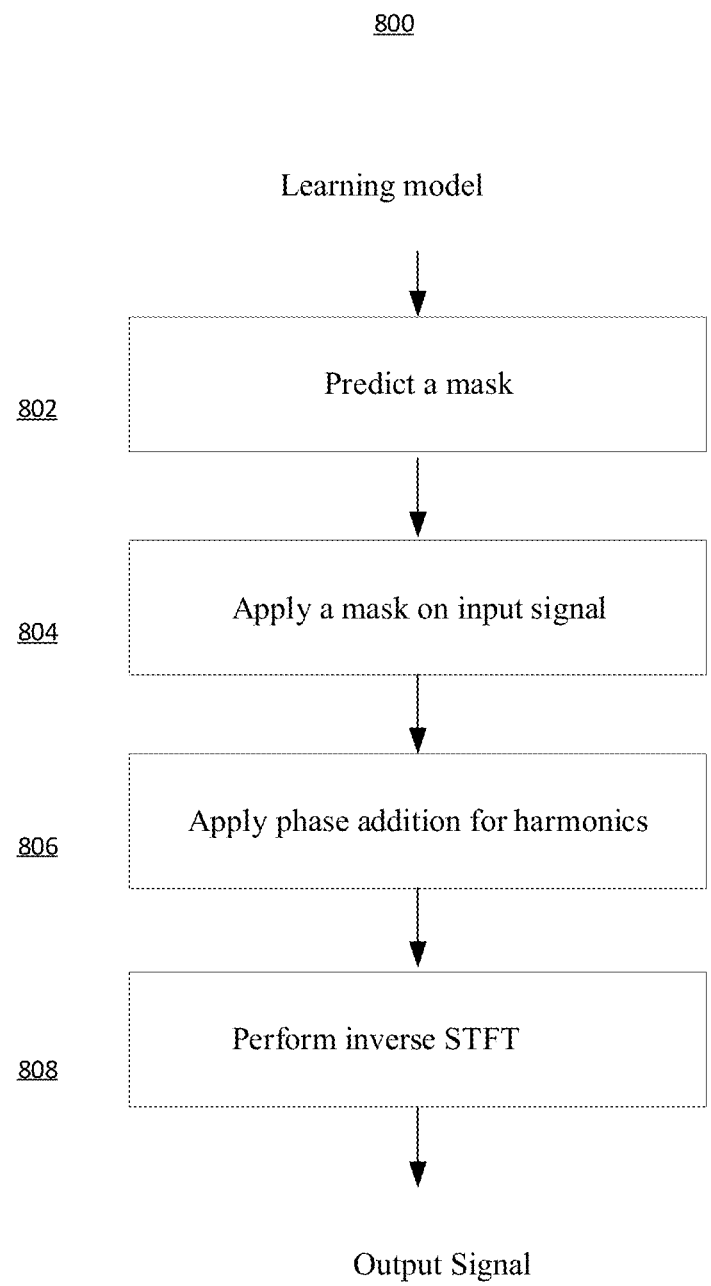
FIG. 8 depicts an illustrative flowchart of a process for usage of a learning model, in accordance with some embodiments of the disclosure.

FIG. 8. shows an illustrative flowchart of a post-processing process 800 for the usage of the learning model in real time. It should be noted that post-processing process 800 may be performed by either conferencing application or by control circuitry 202, 210 of FIG. 2 as instructed by the streaming application that is performed on any client device. In some embodiments, post-processing process 800 is performed by audio data training server 108 that is remote from server 104 or computing device 114.

At 802, the conferencing application predicts a mask using a learning model. The prediction may be made in real time.

At 804, the conferencing application applies the mask on the input STFT signals. The input signals may be converted to frequency-domain signals using the short-time Fourier Transform.

At 806, the conferencing application applies phase addition for harmonics of the sound based on corresponding weights. The conferencing application may add a layer of harmonics to magnify the richness of the sound. Any algorithm may be used to add additional harmonics to the sound or change the existing harmonics. In some embodiments, harmonic addition functionality may already be applied in the learning model. In some embodiments, harmonic addition may additionally be added to the learning model.

At 808, the conferencing application applies Inverse short-time Fourier transform (ISTFT) to convert the frequency-domain signals to audio signals that are compatible to be transmitted to the users of the conference call.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for adjusting a sound level during a conference call involving a plurality of devices via a communications network, the method comprising:
identifying audio to be output at a first device of the plurality of devices during the conference call;
identifying a learning model that is specific to the first device and that is trained using audio data of at least one conference call;
determining, that the audio to be output at the first device comprises a first sound and a second sound, wherein the first sound is received from a human speaker;
identifying a non-human source of the second sound using the learning model that is specific to the first device;
analyzing at least a portion of the second sound to generate a label;
generating for display a first user selectable element for a volume control of the human speaker, and generating for display a second user selectable element with the generated label for controlling a volume of the non-human source of the second sound;
receiving a user selection setting the first user selectable element associated with the first sound at a first sound level different from a default sound level;
causing adjustment of the volume of the non-human source of the second sound; and
causing outputting of the first sound at the first sound level while the second sound is being output at the adjusted volume.

2. The method of claim 1, further comprising:
identifying second audio to be output at a second device of the plurality of devices during the conference call;
identifying a learning model that is specific to the second device and that is trained using audio data of one or more conference calls, wherein the learning model that is specific to the second device is different from the learning model that is specific to the first device;
determining that the second audio comprises the first sound and the second sound; and
identifying the non-human source of the second sound using the learning model that is specific to the second device.

3. The method of claim 2, further comprising:
analyzing a second portion of the second sound to generate a second label;
generating for display a third user selectable element for a second volume control of the human speaker, and generating for display a fourth user selectable element with a second generated label for controlling a second volume of the non-human source of the second sound;
receiving a second user selection setting the third user selectable element associated with the first sound at a second sound level different from the default sound level;
causing adjustment of a second volume of the non-human source of the second sound; and
causing outputting of the first sound at the second sound level while the second sound is being output at the adjusted second volume.

4. The method of claim 3, wherein the first sound is caused to be output at the first sound level at the first device while the second sound is being output at the adjusted volume at the first device, and wherein the first sound is caused to be output at the second sound level at the second device while the second sound is being output at the adjusted second volume at the second device.

5. The method of claim 1, further comprising:
applying a corresponding weight filter to the respective first and second sounds based on a user selection setting a respective user selectable element at a user-specified sound level.

6. The method of claim 5, further comprising:
setting a respective user selectable element at the default sound level, wherein the default sound level indicates an original sound level, and wherein the default sound level is output without applying the corresponding weight filter to the respective sound.

7. The method of claim 1, wherein the learning model is trained at least in part using combined audio data of the first and second sounds.

8. The method of claim 1, wherein the adjusting the volume of the non-human source of the second sound comprises at least one of enhancing or reducing the second sound.

9. The method of claim 1, wherein outputting the first sound at the first sound level is based at least in part on statistical spectral features including at least one of flatness, perceptual spread, or shape of the first sound.

10. The method of claim 1, wherein each of the user selectable elements is a slider that moves along a respective sliding region of the respective one of the user selectable elements.

11. A system for adjusting a sound level during a conference call involving a plurality of devices via a communications network, the system comprising:
control circuitry configured to:
identify audio to be output at a first device of the plurality of devices during the conference call;
identify a learning model that is specific to the first device and that is trained using audio data of at least one conference call;
determine that the audio to be output at the first device comprises a first sound and a second sound, wherein the first sound is received from a human speaker;
identify a non-human source of the second sound using the learning model that is specific to the first device;
analyze at least a portion of the second sound to generate a label;
generate for display a first user selectable element for a volume control of the human speaker, and generating for display a second user selectable element with the generated label for controlling a volume of the non-human source of the second sound;
receive a user selection setting the first user selectable element associated with the first sound at a first sound level different from a default sound level;
cause adjustment of the volume of the non-human source of the second sound; and
cause output of the first sound at the first sound level while the second sound is being output at the adjusted volume.

12. The system of claim 11, wherein the control circuitry is further configured to:
a identify second audio to be output at a second device of the plurality of devices during the conference call;
identify a learning model that is specific to the second device and that is trained using audio data of one or more conference calls, wherein the learning model that is specific to the second device is different from the learning model that is specific to the first device;
determine, by control circuitry of the second device, that the second audio comprises the first sound and the second sound; and
identify the non-human source of the second sound using the learning model that is specific to the second device.

13. The system of claim 12 the control circuitry further configured to:
analyze a second portion of the second sound to generate a second label;
generate for display a third user selectable element for a second volume control of the human speaker, and generating for display a fourth user selectable element with a second generated label for controlling a second volume of the non-human source of the second sound;
receive a second user selection setting the third user selectable element associated with the first sound at a second sound level different from the default sound level;
cause adjustment of a second volume of the non-human source of the second sound; and
cause output of the first sound at the second sound level while the second sound is being output at the adjusted second volume.

14. The system of claim 13, wherein the control circuitry is configured to cause the first sound to be output at the first sound level at the first device while the second sound is being output at the adjusted volume at the first device, and wherein the control circuitry is configured to cause the first sound at the second sound level while the second sound is being output at the adjusted second at the second device.

15. The system of claim 11, the control circuitry further configured to:
apply a corresponding weight filter to the respective first and second sounds based on a user selection setting a respective user selectable element at a user-specified sound level.

16. The system of claim 15, the control circuitry further configured to:
set a respective user selectable element at the default sound level, wherein the default sound level indicates an original sound level, and wherein the default sound level is output without applying the corresponding weight filter to the respective sound.

17. The system of claim 11, wherein the learning model is trained at least in part using combined audio data of the first and second sounds.

18. The system of claim 11, wherein the adjusting the volume of the non-human source of the second sound comprises at least one of enhancing or reducing the second sound.

19. The system of claim 11, wherein outputting the first sound at the first sound level is based at least in part on statistical spectral features including at least one of flatness, perceptual spread, or shape of the first sound.

20. The system of claim 11, wherein each of the user selectable elements is a slider that moves along a respective sliding region of the respective one of the user selectable elements.

* * * * *